United States Patent [19]

Lipinski et al.

[11] Patent Number: 4,664,019
[45] Date of Patent: May 12, 1987

[54] LINEAR POWER AND MOTION TRANSMISSION APPARATUS

[75] Inventors: Reinhard Lipinski, Plochingen; Siegmund H. Kaiser, Nürtingen, both of Fed. Rep. of Germany

[73] Assignee: Proma Product and Marketing GmbH, Plochingen, Fed. Rep. of Germany

[21] Appl. No.: 713,196

[22] Filed: Mar. 18, 1985

[30] Foreign Application Priority Data

Apr. 10, 1984 [EP] European Pat. Off. ........ 84103974.6

[51] Int. Cl.$^4$ ............................................. F01B 29/00
[52] U.S. Cl. ......................................... 92/88; 92/5 R
[58] Field of Search ........................... 92/5 R, 88, 137

[56] References Cited

U.S. PATENT DOCUMENTS

| | | | |
|---|---|---|---|
| 3,359,869 | 12/1967 | Avrea | 92/5 R |
| 4,347,791 | 9/1982 | Mandros | 92/88 |
| 4,373,427 | 2/1983 | Garlapaty | 92/88 |
| 4,373,599 | 2/1983 | Walter | 92/88 |
| 4,485,690 | 12/1984 | Lipinski | 74/609 |
| 4,512,208 | 4/1985 | Lipinski | 74/89.15 |
| 4,519,297 | 5/1985 | Lipinski | 92/88 |
| 4,545,290 | 10/1985 | Lieberman | 92/88 |

FOREIGN PATENT DOCUMENTS 949534 9/1956 Fed. Rep. of Germany .
3124915 1/1983 Fed. Rep. of Germany .

Primary Examiner—Abraham Hershkovitz
Attorney, Agent, or Firm—Frishauf, Holtz, Goodman & Woodward

[57] ABSTRACT

A linear motion transfer apparatus has a longitudinally slit elongated tubular structure (1) closed at its ends, in which a force accepting element (4) driven in the axial direction is guided in a longitudinally displaceable manner, and the longitudinal slit (10) of which is sealed off at both ends of the force accepting element by an inner flexible sealing element (27), which is guided underneath a force transfer element (11) protruding to the outside through the longitudinal slit and connected to the force accepting element (11), and with which a flexible covering element (30) is associated. The force transfer element (11) is longitudinally guided, by means of a ball-like guide element (17) partially encompassing the tubular structure (10), on at least two parallel guide tracks (16), which are disposed on both sides of the longitudinal slit (10) directly on the outside of the tubular structure (1). In order to prevent uneven loading, especially of the force accepting element, caused by tolerances, the arrangement is such that the force accepting element (4) is coupled to the guide element (17) at least one bearing (18) in such a manner that limited movement is permitted.

20 Claims, 6 Drawing Figures

LINEAR POWER AND MOTION TRANSMISSION APPARATUS

Cross reference to related applications, assigned to the assignee of the present invention, the disclosure of which is hereby incorporated by reference:

U.S. Ser. No. 383,795, filed June 1, 1983, KAISER;
U.S. Ser. No. 447,522, filed Dec. 7, 1982, LIPINSKI et al, now U.S. Pat. No. 4,485,690;
U.S. Ser. No. 463,167, filed Feb. 2, 1983, LIPINSKI et al now U.S. Pat. No. 4,512,208;
U.S. Ser. No. 563,028, filed Dec. 19, 1983, LIPINSKI, now U.S. Pat. No. 4,519,297.

The present invention relates to, a motion transfer apparatus and more particularly to an apparatus to convert rotary, or fluid pressure force into a linear motion, by engaging reciprocable pistons, operating in a tubular element which, if pressure fluid is to be used, forms cylinders for the piston or, if a rotary spindle is used, forms a guide tube for the piston. The guide tube is formed with a slit. The slit can be closed to prevent escape of pressure fluid or, if used with a spindle, to prevent ingress of contamination, dirt, and the like to the spindle.

BACKGROUND

Linear transport apparatus of the type to which the present invention relates is described in the referenced and incorporated applications, and particularly U.S. Ser. No. 563,028, filed Dec. 19, 1983, now U.S. Pat. No. 4,519,297 LIPINSKI. This apparatus is constructed in the form of a pressure fluid cylinder in which pistons, subject to pressure fluid, form the elements to which a motion transfer element passing through the slit of the cylinder is connected.

The motion and force transfer element which protrudes to the outside through the longitudinal slit is rigidly connected at one end to the piston and at the other to the bail-like guide element which is constrained to slide accurately longitudinally along both sides of the longitudinal slit on the outer wall of the tubular element. In order to prevent an undesirable, imbalanced load on the elastic sealing sleeves of the piston upon a tipping movement of the piston, which is unavoidable given the necessity for freedom of piston movement as well as manufacturing tolerances, the piston has two piston elements disposed on both ends of the force transfer element, each of which has at least one piston/cylinder seal. The two piston elements are movably connected to the force transfer element in a radially limited way. The compensation for manufacturing tolerances that is attainable in this manner is effective. It has been found that larger and other deviations may have to be compensated for in some structures.

THE INVENTION

It is an object to improve a motion transfer apparatus of this type such that malfunctions due to uneven loads on the force accepting element disposed in the tubular structure resulting from uneven or excessive loads on the force transfer element or the guide element, or from manufacturing tolerances, especially for the guides and the tubular structure, are prevented, without requiring expensive engineering provisions to attain this.

Briefly, the pistons, which form the force-accepting elements operable within the tube, that is, responding to fluid pressure or longitudinal displacements upon rotation of a spindle, are longitudinally guided in the outer tube which may be a cylinder, or a guide tube. A coupling element is provided which is slidable on outer guide surfaces, e.g., formed on the cylinder, or tube, respectively, and coupled to the force accepting elements eg. the pistons within the tube. In order to avoid the transfer of twisting forces between the external motion transfer elements and the pistons, their seals, and the guide surfaces on the cylinder, or tube, respectively, and to provide for uniform loading of the force transfer elements, e.g., pistons, the elements subjected to the external force are coupled to a motion transfer element, which in turn is coupled to the piston, by a coupling which includes a bearing, or pivot. This provide for self-alignment of the coupling element externally of the cylinder or tube, while the motion transfer element is coupled directly to the force accepting element, e.g., piston. Transfer of twisting forces applied to the coupling element unto the pistons is thus prevented.

In this linear motion transfer apparatus, the force accepting element is guided in the interior of the tubular structure, where it is capable of correct self-positioning without external hindrance. On the other hand, the guidance of the guide element on the guide tracks provided on the outside of the tubular structure need take only slight account of the force accepting element, because the coupling between the external guide element within the tube and the force accepting element permits limited movement. In this manner, tolerances in manufacturing or arising during operation, whether of the guide tracks or in their position relative to one another, can be compensated for automatically, without requiring particular provisions to be made in the force accepting element itself.

Since the force transfer element is largely independent of the guidance by the guide element, it may also, in one embodiment, be guided on the side walls of the longitudinal slit of the tubular structure if needed, in addition to the guidance within the tubular structure. To this end, the force transfer element may be supported laterally, via guide elements, such that it slides or rolls on the side walls of the longitudinal slit. Such guide elements may for instance be guide blocks, which engage the grooves, associated with the flexible elongated sealing element, in the side walls of the longitudinal slit and are guided there.

The bearing advantageously has at least one bearing axis, preferably extending at right angles to the cylinder axis and in the central plane of the longitudinal slit, to enable the limited relative rotation of the force transfer element and the guide element. To this end, the arrangement may be such that the bearing has a circular bearing element, joined to the force transfer element or the guide element, which rotatably engages a correspondingly shaped bearing cup on the other element, that is, on the guide element or the force transfer element, respectively.

The force transfer element and the guide element may also be joined together at the bearing such that they are capable of limited relative movement in the direction of the bearing axis, so that differences in spacing between the guide element and the axis of the tubular structure or the force accepting element can be compensated automatically. To this end, in the embodiment mentioned, the cyindrical bearing element can be supported in the bearing cup such as to be displaceable in the direction of the bearing axis.

Very simple structural conditions are obtained if the flexible elongated sealing element above the bearing is guided extending all the way through the guide element, which may be very narrow. It is then sufficient for a covering for this sealing element to be placed upon the guide element.

There is considerable freedom of design of the guide element and the elements joined to it, because of the coupling with limited movement of the guide element with the force accepting element guided in the tubular structure. The guide element may for instance be rigidly connected to a slit that is longitudinally guided on the outside of the tubular structure, the slit being for instance disposed on the underside of the tubular structure remote from the longitudinal slit and assuming the function of longitudinal guidance of the guide element.

If the guide element is correspondingly narrow in embodiment, a measuring scale may be disposed on the outside of the tubular structure, in the vicinity of the longitudinal slit, cooperating with the guide element; at least one longitudinally extending reinforcement element may also be provided on the tubular structure beside the longitudinal slit, should this become necessary, for instance in the case of relatively long tubular structures.

As already noted at the outset, the force accepting element may be a piston sealed off with respect to the inner wall of the tubular structure and subject at both ends to a pressure fluid, the tubular structure being embodied as a pressure fluid cylinder.

The structure becomes particularly simple if the piston has a tube joined to the transfer element, and one coaxial piston part, bearing sealing devices, is inserted at each end into this tube. The tube, which is independent of the guide element, need be only as long as required by the narrowest cross section for transmitting the maximum incident force.

In another embodiment, the force accepting element may instead be a spindle nut, which is mounted on a threaded spindle disposed at the ends of the tubular structure in a rotatable manner and which can be coupled with a drive source.

Exemplary embodiments of the subject of the invention are shown in the drawing.

DRAWING

FIG. 4 shows a further modified embodiment of the motion transfer apparatus of FIG. 1, again in a partially cutaway perspective view, with the guide-element omitted;

FIG. 5 shows the motion transfer apparatus of FIG. 4, in a cross-sectional view along the lines V—V of FIG. 4, and FIG. 6 shows the motion transfer apparatus of FIG. 2, in a cross-sectional view, similar to FIG. 5.

DETAILED DESCRIPTION

Figure 1:
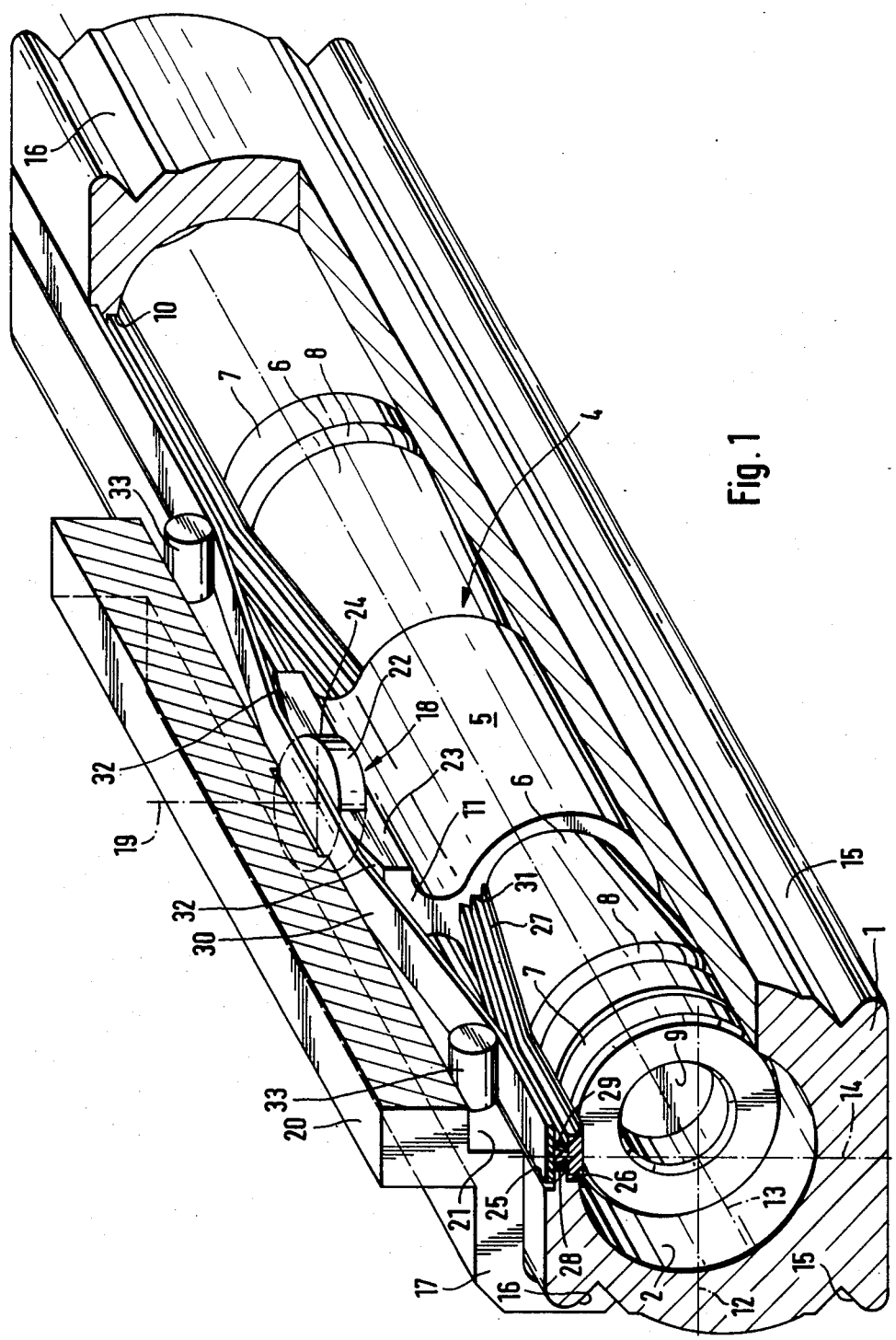
FIG. 1 shows a motion transfer apparatus according to the invention embodied as a pressure fluid cylinder, in a partially cutaway perspective view.

The linear transport or motion transfer apparatus shown in FIG. 1 is embodied in the form of a pressure fluid cylinder. It has a cylindrical tubular structure 1, the cylindrical bore 2 of which is closed at its ends by lids or end elements, not shown in detail, one of which is visible at 3 in FIG. 3.

A piston 4, acting as a force accepting element, is guided longitudinally displaceably in the cylindrical bore 2 and has a thin-walled, relatively short tube segment 5 into which two substantially frustoconical piston parts 6, optionally of plastic material, are inserted with a tang or the like engaging the tube segment 5 (see U.S. Pat. No. 4,519,297). The coaxial piston parts 6 each have a cylindrical segment 7, in the vicinity of which a piston seal 8 is disposed, which cooperates with the wall of the cylindrical bore 2 such that the piston 4 is sealed off from the cylindrical bore 2 by the two cylindrical seals 8.

The two piston parts 6 are each provided at the end with a coaxial blind bore 9, which in the end position of the piston can cooperate with a tang-like damping element, not shown in further detail, disposed on the associated lid 3.

The tubular structure 1 is formed with a longitudinal slit 10 on its top, through which a rib-like force transfer element 11 molded in one piece with the tube 5 protrudes to the outside.

Guide track means 15, 16 located one either side of the vertical central plane 14 extending through the longitudinal slit 10 are disposed in pairs associated with one another on the outside of the tubular structure 1, above and below the central plane 12 containing the axis 13 of the cylindrical bore 2.

In the embodiment shown in FIG. 1, and external bail-like guide element 17 that is external of tube 1 is supported in a longitudinally displaceable manner on the two guide tracks 16 located above the central plane 12 and extending on both sides of the longitudinal slit 10. In accordance of the feature of the invention, the external guide element 17 is coupled to the force transfer element 11 and hence to tube 5 coupled to the piston parts 6. This guide element 17 is joined to the piston 4 acting as the force accepting element 4 in a limitedly movable manner by a bearing 18 having a bearing axis 19 perpendicular to the axis of cylinder bore 2.

The bearing 18, which is located outside the tubular structure 1, has a bearing axis 19 located in the longitudinal central plane 14; about this axis 19, the force transfer element 11 and the guide element 17 are rotatable to a limited extent relative to one another, in order to compensate tolerances.

The bearing 18 is formed by a disc 22, which is coaxial with the bearing axis 19 and defines one part of the bearing. Disc 22 is secured on a rib-like part 20 of the guide element 17 in the vicinity of the bottom of a longitudinal groove 21, defined by the guide element 17, extending above the longitudinal slit 10. This disc 22 is inserted into a cylindrical bearing cup 24, formed on a correspondingly widened part 23 of the force transfer element 11, such as to be rotatable about, and displaceable in the direction of, the bearing axis 19.

Since the guide element 17 and the force transfer element 11 are thus joined to one another at the bearing 18 such that they are rotatable to a limited extent about the bearing axis 19 and longitudinally displaceable relative to one another to a limited extent in the direction of the bearing axis 19, manufacturing tolerances in the guide tracks 16 and so forth can be compensated automatically, without uneven loading being transferred to the tube segment 5 of the piston 4 via the force transfer element 11.

In principle, it would also be conceivable for the bearing part embodied as a disc 22 to be formed instead as a ball, for instance, which then engages a correspondingly spherical bearing cup 24, so that limited tipping of the piston 4 about a horizontal tilting axis relative to the guide element 17, and vice versa, is provided.

Figure 4:
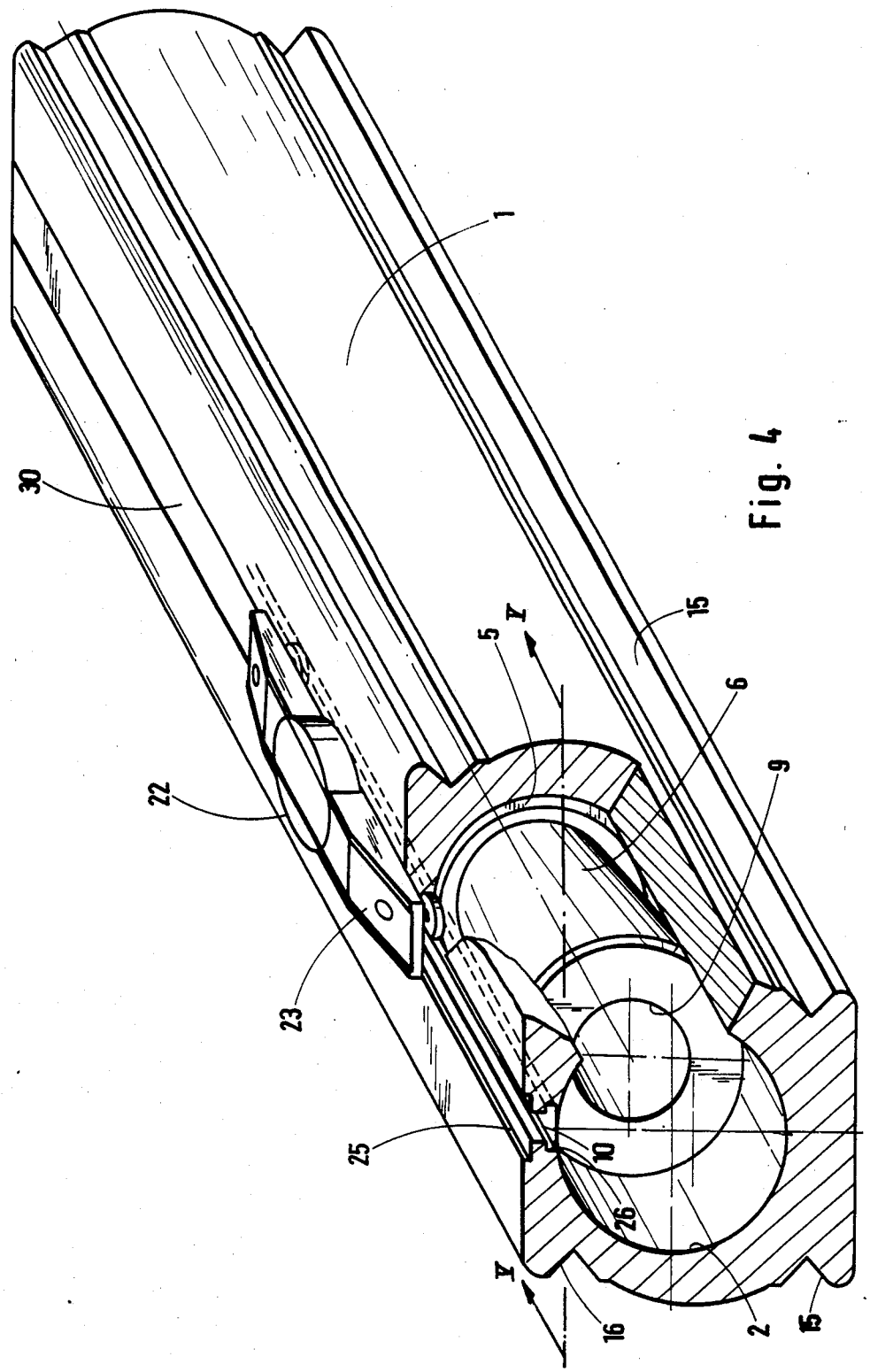
FIG. 4 shows the structure of FIG. 1 with the guide element removed, and wherein the force transfer element includes a guide roller.
Figure 5:
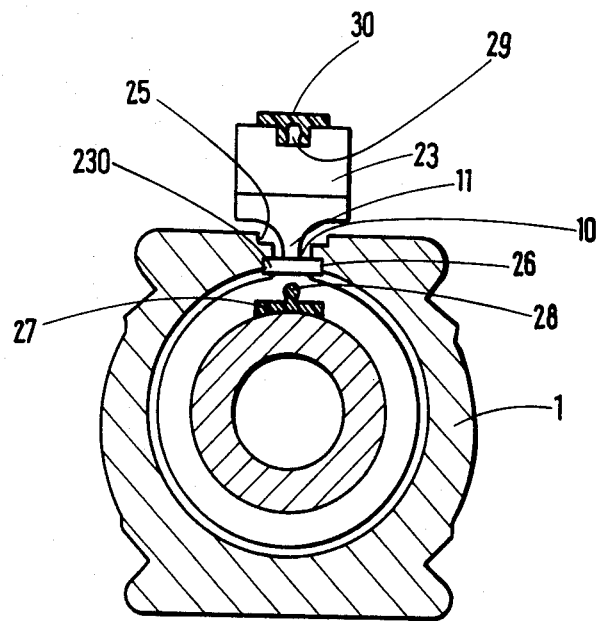
FIG. 5 is a sectional view along lines V—V of FIG. 4.

The force transfer element 11 may be guided laterally by opposing surfaces, on rib 23 on the side walls of the longitudinal slit 10. The arrangement may also be such that the force transfer element 11 has laterally disposed guide rollerrs 230 or sliding blocks, which cooperate with the side walls of the longitudinal slit 10 or the longitudinal grooves 25, 26 (see FIGS. 4, 5) provided there.

On both ends of the force transfer element 11, the longitudinal slit 10 is sealed off by a flexible elongated sealing element 27, which is anchored at the ends in the lids 3 and extends in the cylindrical bore 2. The sealing element 27, which is of plastic material, has as rib 28, with which it protrudes through the longitudinal slit 10 and which engages a longitudinal groove 29 in a flexible elongated sealing element 30, which seals the longitudinal slit 10 off from the outside, extending along the top of the tubular structure 1. The flexible elongated sealing elements 30 and 27 are located on the bottoms of the grooves 25 and 26, respectively. The structure of these two elements 30, 27 and their cooperation are described in detail in German Pat. No. 31 24 915, for example to which U.S. application Ser. No. 383,795, filed June 1, 1983 corresponds.

In the pressure-free region between the two piston seals 8, the sealing element 27 is passed through an aperture 31 on the tube segment 5 below the force transfer element 11, following along the conical circumferential surface of the two piston parts 8, so that in this pressure-free region it is raised from the longitudinal slit 10, enabling the passage of the force transfer element 11 through the longitudinal slit 10.

In this same region, the flexible elongated sealing element 30 is guided on beyond the disc 22 over corresponding shaped oblique-surfaced elements 32 of the force transfer element 11. Guide rollers 33 disposed on the guide element 17 on both sides of the bearing 18, during a longitudinal movement of the piston 4, press the sealing element 30 down upon the longitudinal slit 10 on the forward end of the piston, while from the direction of the cylindrical bore 2 the corresponding piston part 6 likewise presses the sealing element 27 against the rim of the longitudinal slit 10, whereupon the longitudinal groove 29 and the rib 28 are in continuous engagement with one another, as is known from the abovenamed German patent.

Figure 2:
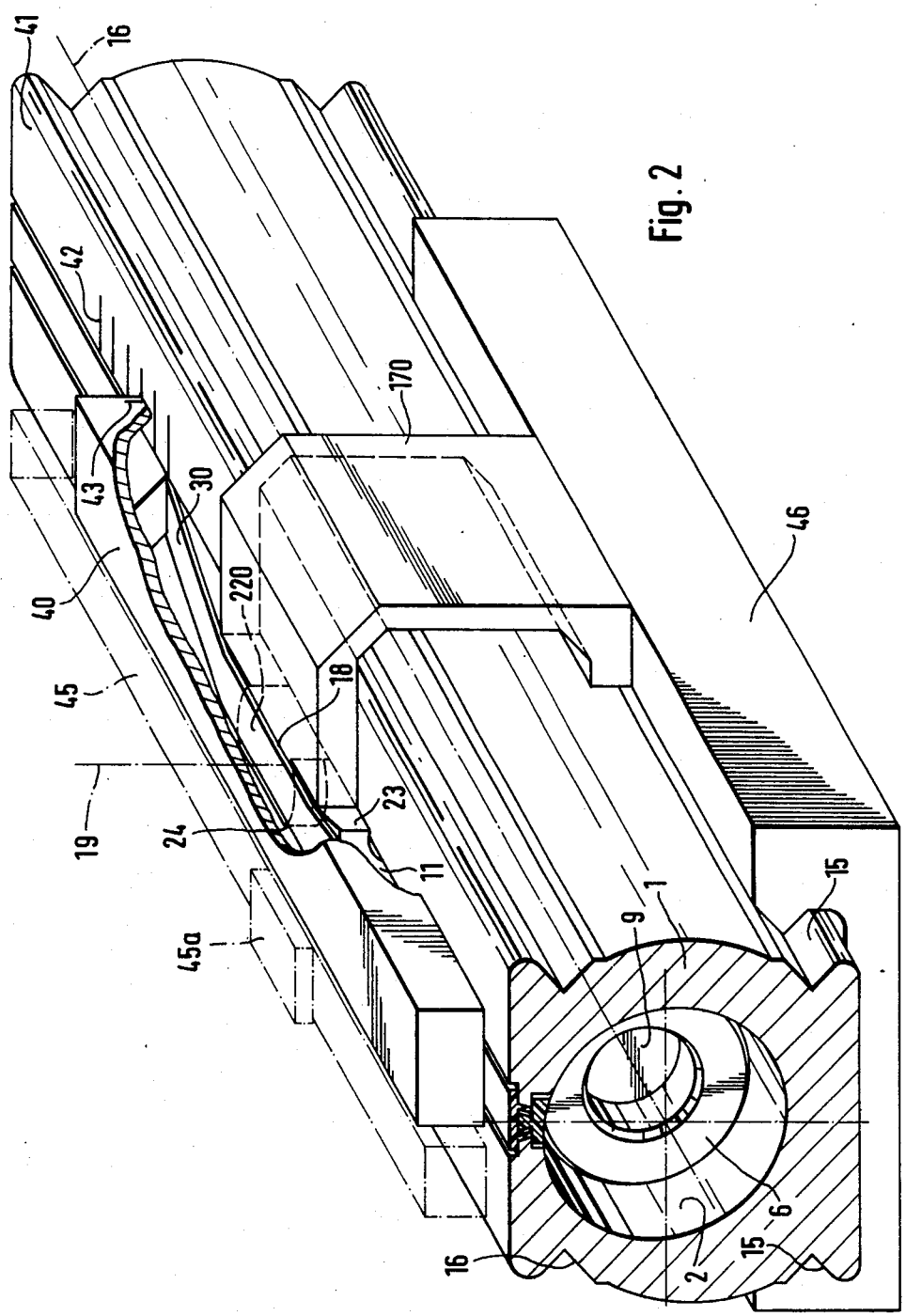
FIG. 2 shows a modified embodiment of the motion transfer apparatus of FIG. 1, again in a partially cutaway perspective view.

The embodiment of the linear motion transfer apparatus of FIG. 2 differs from that of FIG. 1 only in that the guide element 170 is embodied somewhat differently from element 17, FIG. 1. Identical elements in the two drawing figures are therefore given identical reference numerals and hence need not be described again.

In the embodiment of FIG. 2, the guide element, formed as a substantially yoke-like bail 170, is provided with a disc-like bearing part 220, which is inserted in an interlocking manner into an appropriately shaped bearing cup 24 disposed on the part 23 of the force transfer element 11. The guide element 170 is thus both movable to a limited extent vertically with respect to the force transfer element 11 at the bearing 18 and pivotable to a limited extent about the vertical bearing axis 19. The bearing 18 and the flexible elongated sealing element 30, which is extended beyond the bearing part 220, are covered by an elongated covering hood 40 mounted thereupon, which is connected to the force transfer element 11 and the width of which is only slightly larger than that of the sealing element 30 and thus of the longitudinal slit 10.

A scale 42 is disposed on a flat, smooth surface 41 adjacent to the longitudinal slit 10 and cooperates with a movable measurement marking shown at 43. Thus the position of the force transfer element 11 in the tubular structure 1 at any time can be read off accurately.

On the side opposite the guide bail 170, a reinforcement strip 45 may be mounted on the tubular structure 1 beside the longitudinal slit 10, preventing the bending of the tubular structure in the case of very long tubular structures 1.

A substantially yoke-like slider 46 is guided in a longitudinally displaceable manner on the two lower guide tracks 15 of the tubular structure 1 and is rigidly joined to the guide bail 170, which in turn no longer requires its own guide means. Driven machine elements and the like may be connected to the slider 46.

Figure 3:
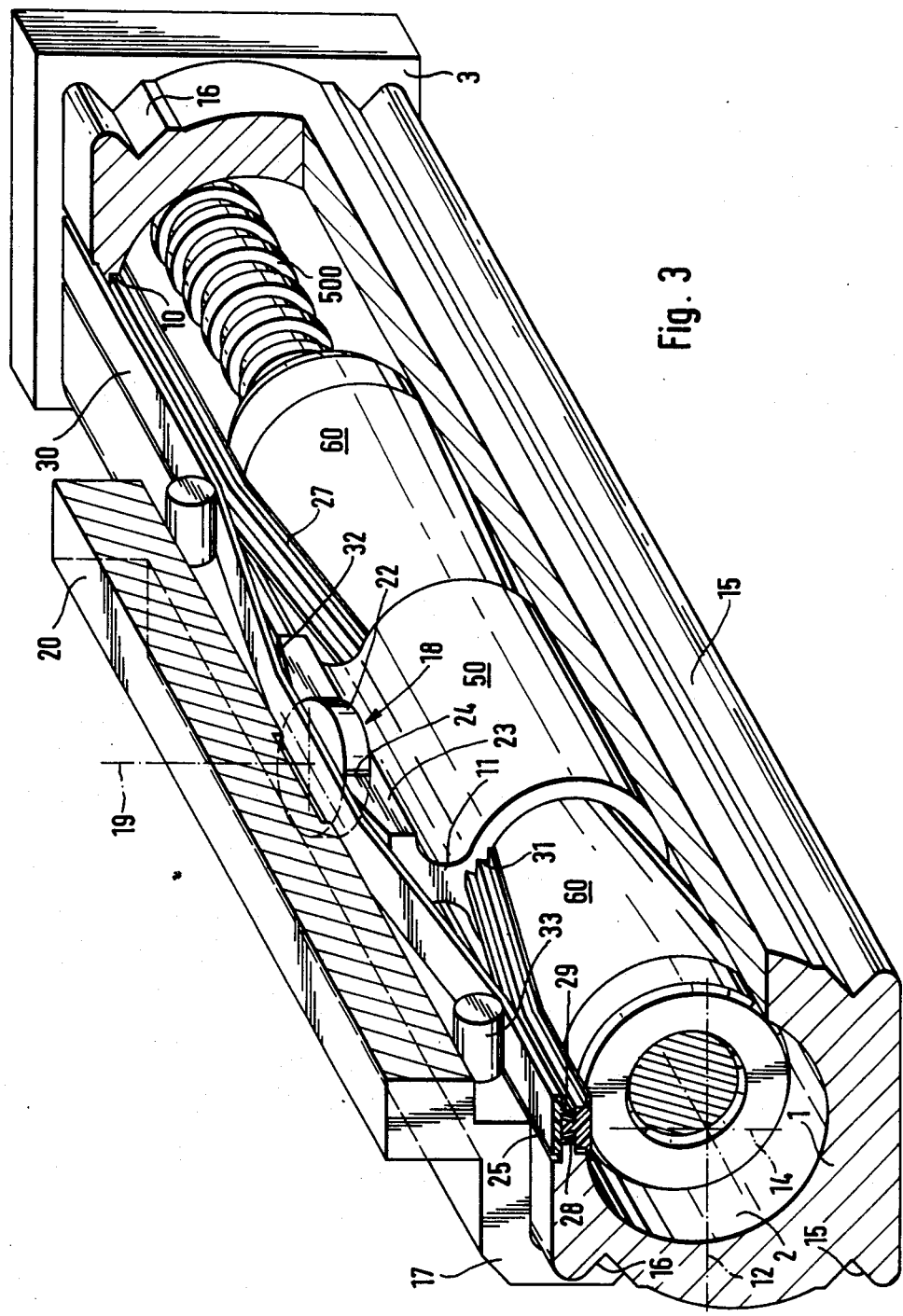
FIG. 3 shows a motion transfer apparatus according to the invention embodied with a spindle drive, in a fragmentary perspective view, partially cut away.

The embodiment of a linear motion transfer apparatus shown in FIG. 3 likewise corresponds largely to that of FIG. 1. Here again, identical elements are provided with identical reference numerals and not described further.

However, while the force accepting element in the embodiment of FIG. 1 is embodied as a piston 4, which when acted upon by pressure fluid on the end faces of the two piston parts is longitudinally displaceable, the force accepting element in the apparatus of FIG. 3 is a spindle nut, which is accommodated in the tube segment 50 and cooperates with a threaded spindle 500, which extends coaxially through the cylindrical bore 2. The threaded spindle 500 is rotatably supported at both ends in the end elements or lids 3; it is equipped to be coupled with a drive source, not otherwise shown, such as an electric motor.

The two frustoconical plastic elements 60 inserted into the tube segment 50 in this case do not have the function of a sealing piston part; instead, their sole function is, like the piston parts 6, to introduce the flexible elongated sealing element 27 into the aperture 31 in the vicinity of the tube segment 50 and guide it back out again.

In an alternative embodiment, an external guide system may also be associated with the tubular structure 1, being oriented parallel to the axis 13 of the cylindrical bore 2.

Figure 6:
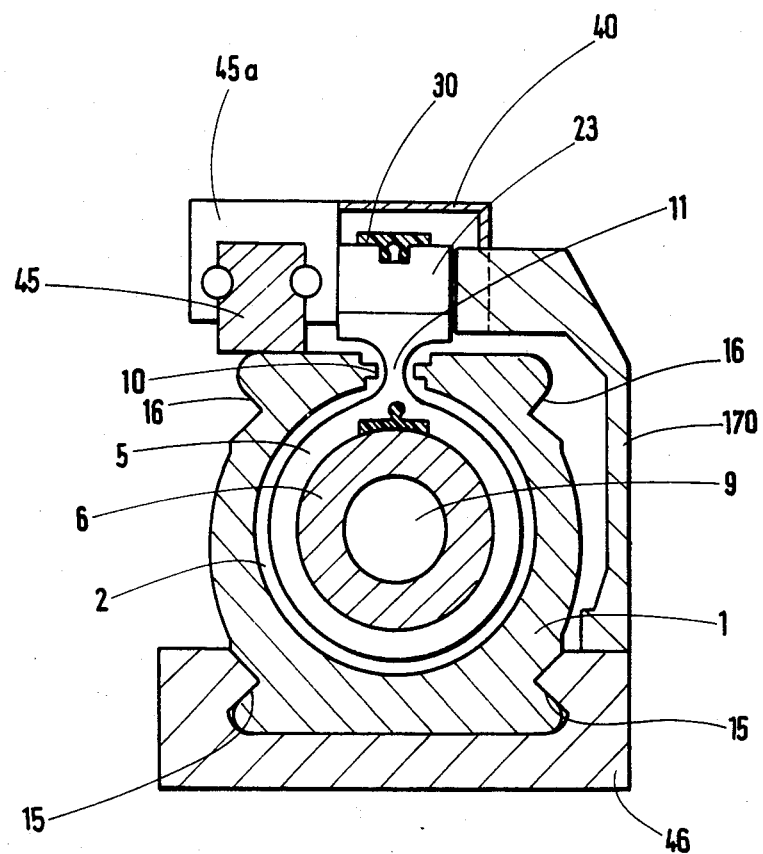
FIG. 6 is a sectional view similar to FIG. 5 of the structure of FIG. 2.

An external guide system of this kind could for instance be provided at 45 in FIGS. 2, 6, using the reinforcement strip 45 as a guide rail, in which case the movable element shown at 45a, which may be embodied as a slider of a ball-type nipple or the like, is movably joined to the force transfer element 11 or the guide element 170, preferably such that movement is limited. Embodiments in which the slider 46 and the guide element 170 are dispensed with are also conceivable, because in that case the external guide system at 45 assumes the function of the elements 46, 170.

The external guide system may furthermore be mounted directly upon the tubular structure 1, not only as shown at 45; or the arrangement may be such that the external guide system is mounted on a rail element disposed on the tubular structure in a stationary manner, but at a location which is different from the location of the reinforcement strip or guide 45, as shown in FIGS. 2, 6.

We claim:

1. Linear motion transfer apparatus having
   an elongated tubular structure (1) formed with a longitudinal slit (10);
   a force accepting element (4,) longitudinally slidably located within the tubular structure (1);
   a force transfer element (11) coupled to the force accepting element (4), longitudinally movable with the tubular structure,
   guide track means (15,16) formed on the outside of the elongated tubular structure;
   an external guide element (17, 170) located outside of the tubular structure guided for reciprocating movement in the guide track means (15, 16, 45) and, at least in part, fitting yokelike about a portion of the circumference of the tubular structure;
   and comprising, in accordance with the invention
   bearing means (18) disposed between the guide element (17, 170) and the force transfer element (11) for coupling the force transfer element (11) to the guide element (17, 170) for conjoint longitudinal movement along the elongated tubular structure upon application of force to one of said force transfer element (4) and said guide element,
   one of which elements extends through the slit (10), said bearing means (18)
   permitting limited rotary movement between the external guide element (17) guided in said guide track means and the force transfer element ((11)0 within the tubular structure for independent alignment of the guide element (17) on the guide track means, and of the force transfer element (11) in the tubular structure (1).

2. Apparatus according to claim 1, wherein the bearing means (18) is located outside the tubular structure (1).

3. Apparatus according to claim 3, wherein the force transfer element (11) extends through and is guided on the side walls of the longitudinal slit (10).

4. Apparatus according to claim 4, wherein the force transfer element (11) includes guide structures which are supported in a sliding engagement with the side walls of the longitudinal slit (10).

5. Apparatus according to claim 3 wherein the force transfer element (11) includes guide structures which are supported in rolling engagement with the side walls of the longitudinal slit (10).

6. Apparatus according to claim 1, wherein the bearing means (18) has at least one bearing axis (19) extending at essentially right angle to the axis (13) of the tubular structure and in the central plane (14) of the longitudinal slit, the force element (11) and the guide element (17, 170) being rotatable relative to one another to a limited extent about the bearing axis (19).

7. Apparatus according to claim 6, wherein the bearing means (18) has a circular bearing part (22, 220) joined to one of the force transfer element (11) and the guide element (17, 170), and rotatably engaging a corresponding bearing cup (24) of the respective other element.

8. Apparatus according to claim 6, wherein the force transfer element (11) and the guide element (17, 170) are connected to one another at the bearing means (18) such that they are displaceable relative to one another to a limited extent in the direction of the bearing axis (19).

9. Apparatus according to claim 7, wherein the cylindrical bearing part (22, 220) is supported in the bearing cup (24) such as to be displaceable to a limited extent in the direction of the bearing axis (19).

10. Apparatus according to claim 1 including a flexible elongated sealing element (30, 27) sealingly positioned to close the slit in regions between end portions of the elongated tubular structure and the force accepting element (4), while permitting longitudinal movement of the force accepting element within the elongated tubular structure, and sealingly re-engage to close the slit in zones behind the force accepting element as it moves longitudinally.

11. Apparatus according to claim 10, wherein the flexible elongated sealing element (30) extends above the bearing (18) and is guided through the guide element (17).

12. Apparatus according to claim 11, wherein a covering (40) for the elongated sealing element (30) is mounted upon the guide element (170).

13. Apparatus according to claim 1, wherein the guide element (170) is rigidly connected to a slider (46) longitudinally guided on the outside of the tubular structure (1), the slider being disposed on the underside of the tubular structure (1) remote from the longitudinal slit (10).

14. Apparatus according to claim 1, wherein a scale (42) is provided and is disposed on the outside of the tubular structure (1) in the vicinity of the longitudinal slit (10), the scale (42) cooperating with the guide element (170) or an element (40) connected therewith.

15. Apparatus according to claim 1, wherein at least one longitudinally extending reinforcement element (45) is provided and is disposed on the tubular structure (1) beside the longitudinal slit (10).

16. Apparatus according to claim 1, wherein the force accepting element is a piston (4) sealed off with respect to the inner wall of the tubular structure.

17. Apparatus according to claim 16, wherein the piston (4) has a tube segment (5) connected to the force transfer element (11), into which tube segment one coaxial piston part (6) bearing sealing devices (8) is inserted at each end.

18. Apparatus according to claim 1, wherein the force accepting element is a spindle nut (50), which is seated on a threaded spindle (500), which in turn is rotatably supported in end elements (3) disposed at the ends on the tubular structure (1) and can be coupled with a drive source.

19. Apparatus according to claim 1, wherein an external guide system, oriented parallel to the cylinder axis (13), is provided, associated with the tubular structure (1), the external guide system having a guided element (45a) connected to one of the force transfer element (11) and the guide element (17, 170).

20. Apparatus according to claim 1 wherein the force transfer element (11) is guided on the sidewall of the longitudinal slit (10) and the bearing means (18) has a bearing axis (19) extending at essentially right angles to the axis (13) of the tubular structure and located in the central plane (14) of the longitudinal slit;

and wherein the force transfer element (11) and the guide element (17, 170) are rotatable relative to another to a limited extent about the bearing axis to provide for said independent alignment of the guide element on the guide track means and of the force transfer element (11) in the slit.

* * * * *